Fig. 1.

INVENTOR.
Thomas B. Johnson
BY
J. Stanley Churchill
ATTORNEY

INVENTOR.
Thomas B. Johnson
BY
J. Stanley Churchill
ATTORNEY

May 30, 1961

T. B. JOHNSON 2,985,912

METHOD OF AND APPARATUS FOR PRODUCING
A MASTIC CAULKING COMPOUND

Filed Feb. 5, 1954

INVENTOR.
Thomas B. Johnson
BY
J. Stanley Churchill
ATTORNEY

May 30, 1961  T. B. JOHNSON  2,985,912
METHOD OF AND APPARATUS FOR PRODUCING
A MASTIC CAULKING COMPOUND
Filed Feb. 5, 1954  6 Sheets-Sheet 6

INVENTOR.
Thomas B. Johnson
BY
J. Stanley Churchill
ATTORNEY

United States Patent Office 2,985,912
Patented May 30, 1961

2,985,912

METHOD OF AND APPARATUS FOR PRODUCING A MASTIC CAULKING COMPOUND

Thomas B. Johnson, Ambridge, Pa., assignor to H. H. Robertson Company, Pittsburgh, Pa., a corporation of Pennsylvania Filed Feb. 5, 1954, Ser. No. 408,527

7 Claims. (Cl. 18—12)

This invention relates to a method of and apparatus for producing a mastic caulking compound.

The invention has for an object to provide a novel and improved method of and apparatus for producing a mastic caulking compound in rope or strand form by which the same may be made in an economical and rapid manner.

A further object of the invention is to provide a novel and improved method of and apparatus for producing a mastic caulking compound in rope or strand form provided with an antistick coating applied thereto and wherein provision is made for producing the same in a continuous operation from the mixing of the compound to the reeling of the coated strand on a spool in a rapid, efficient and economical manner.

With these general objects in view and such others as may hereinafter appear, the invention consists in the novel method of and apparatus for producing a mastic caulking compound and in the various structures, arrangements and combinations of parts hereinafter described and particularly defined in the claims at the end of this specification.

In the drawings illustrating the preferred embodiment of the invention.

In general the present invention contemplates a novel method of and apparatus for producing a mastic caulking compound in a continuous rope or strand form having an antistick coating applied thereto wherein the mastic compound is first mixed in a heated chamber or mixing hopper into a uniform consistency, the heat being preferably controlled to obtain the desired viscosity. The compound is then fed to a preliminary extrusion chamber to provide a plurality of relatively small diameter strands whereby to increase the exposed surface area of the mastic compound whereupon the strands are passed through a cooling chamber to lower the temperature of the compound to a degree and consistency suitable for passing through the final extrusion die. The final extrusion die produces a plurality of ropes of the compound which are provided with an antistick coating and then passed through a hot air chamber to speed up the evaporation of the solvents contained in the antistick and forming a tough skin or film over the surfaces of the ropes. The ropes are then guided through a cool air chamber to effect setting up of the base material contained in the antistick and final drying of the antistick before reeling the continuous strands onto a spool.

The particular composition of the mastic compound may be varied over wide limits, and the components may comprise a wide variety of ingredients. In general the mastic compound may be composed of combinations of petroleum or vegetable oils or low softening point asphalts with pigments, bodying agents and fillers, such as iron oxide, aluminum powder, talc, mica, asbestos fibers, china clay, and the like blended to a consistency which is plastic but which shows no liquid flow at temperatures as high as 180° F. The antistick coating may be composed of film-forming materials, such as methyl cellulose, ethyl cellulose, nitrocellulose, carboxymethylcellulose, sodium cellulose sulphate, drying oils, resins and the like, compounded with solvents and plasticizers to the desired working properties.

One of the problems encountered in the production of a mastic caulking compound composed of the above ingredients in a continuous process is that the temperature of the mastic compound during the mixing thereof to obtain the desired blend is necessarily considerably higher than the desired temperature of the compound as it enters the final extruding die. In practice the mixing temperature is preferably approximately 180° F., and the desired extruding temperature is about 95° F. In accordance with one feature of the present invention this problem is solved by dispersing and cooling the mastic compound after the mixing operation by a preliminary extrusion of many relatively small strands of the compound to accelerate the cooling step when passed through a cool air chamber during its progress from the mixing chamber to the final extrusion die, the lowered temperature rendering the mastic sufficiently firm to form ropes adapted to be passed from the final extruding die directly into the antistick coating mechanism. In the illustrated embodiment of the invention the novel antistick coating mechanism includes a plurality of tubes of larger diameter than the ropes, the tubes being in communication with a supply of the fluid antistick coating, such fluid serving also as a lubricant to facilitate passage of the ropes through the tubes and into an aligned position, as will be described. Provision is also made for controlling the thickness of the film of antistick on the mastic ropes, as will also be described.

Another feature of the present invention includes novel reeling mechanism adapted to reel the ropes in coils disposed side by side upon a spool and which is characterized by novel driving mechanism arranged to maintain a positive constant surface take-up speed regardless of the increase in diameter of the coil as it is reeled up on the spool so that the ropes extruded at a uniform rate of speed may be reeled into a spiral coil at substantially the same surface speed as the speed of extrusion.

Figure 1:
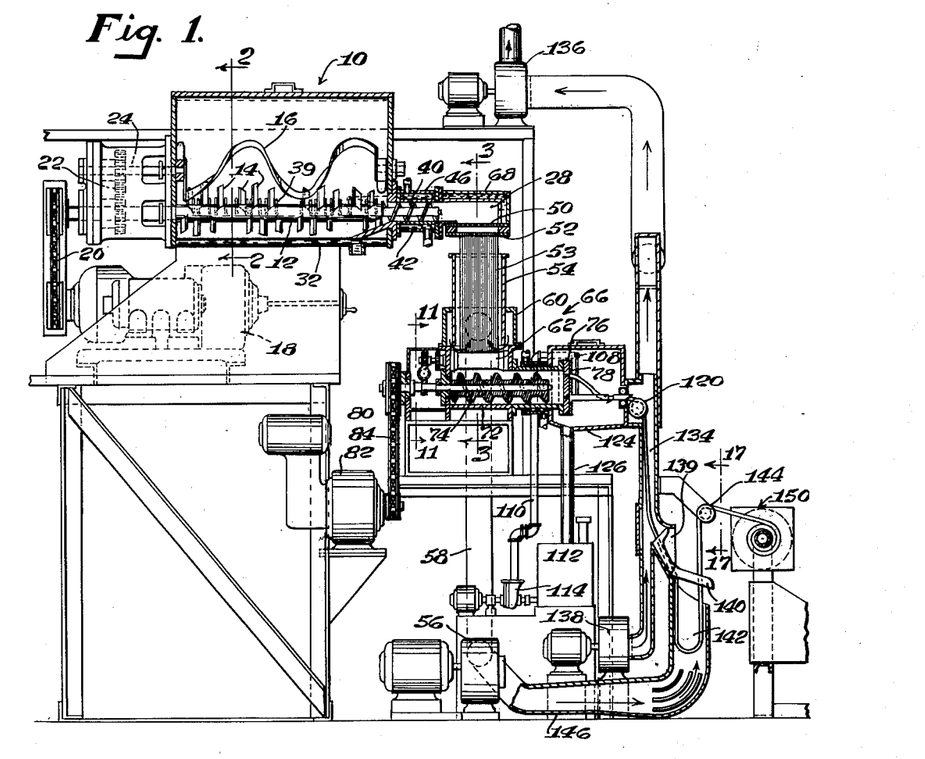
Fig. 1 is a front elevation partly in cross section of a preferred form of apparatus for producing a mastic caulking compound in accordance with the present invention.
Figures 2, 3, 4, 5:
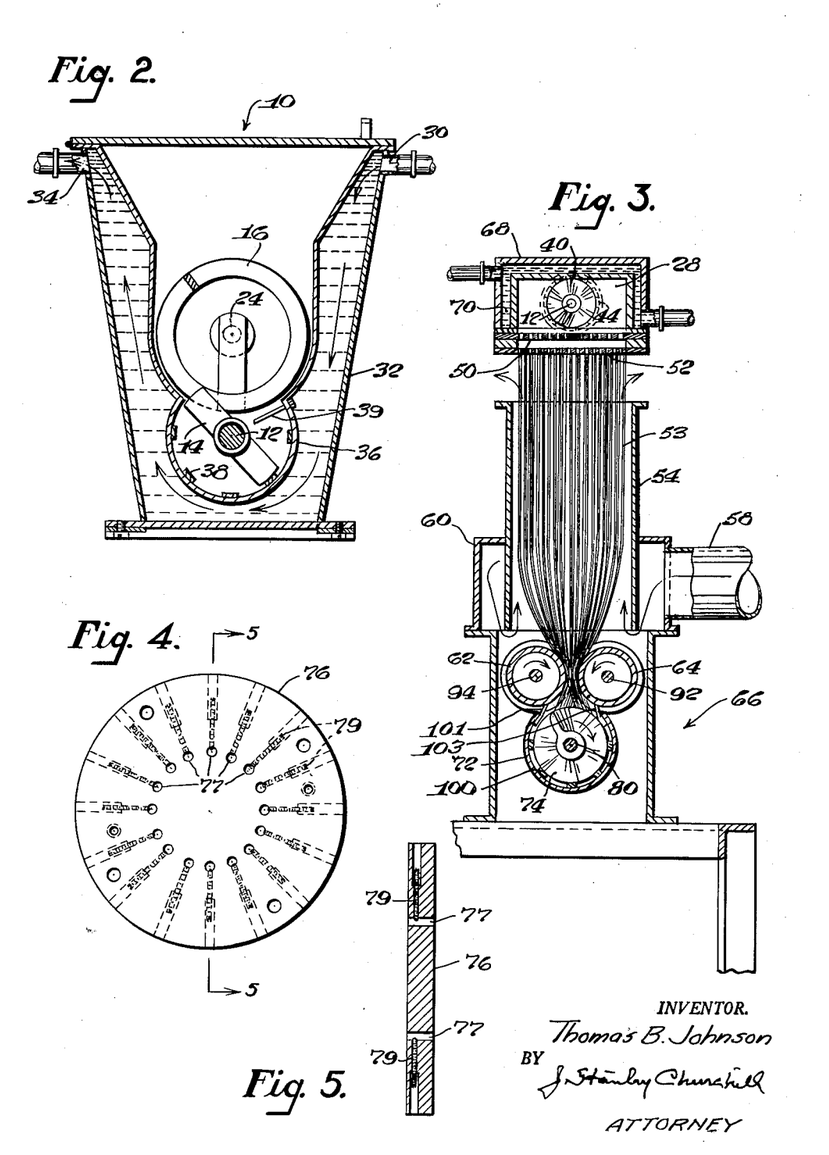
Fig. 2 is a detail view in cross section of the mixing hopper as taken on the line 2—2 of Fig. 1.
Fig. 3 is a cross-sectional view taken on the line 3—3 of Fig. 1 showing the preliminary extruding and cooling mechanism.
Fig. 4 is a front elevation detail of the final extruding die.
Fig. 5 is a cross-sectional view of the same taken on the line 5—5 of Fig. 4.

Referring now to the drawings, 10 represents the mixing and feeding hopper into which the ingredients of the caulking compound are placed and mixed. As herein shown, the mixing is performed by a rotating shaft 12 provided with a plurality of pug knives 14 and which cooperate with a spiralled mixing bar 16. The thrust of the spiralled mixing bar is arranged to oppose the thrust of the pug knives, and the pug knives are so arranged about the shaft that in operation the spiralled bar enters between the pug knives without interfering with their function. The shaft 12 and spiralled bar 16 are arranged to be rotated by a reversible motor 18 connected by a chain and sprocket drive 20 to the shaft 12 which is connected by spur gears 22 to a shaft 24 to which the spiralled bar 16 is connected, the other end of the spiralled bar being attached to a stud 26 journalled in the opposite side of the hopper 10. In practice the mixing shaft 12 and bar 16 are rotated in one direction to effect the mixing operation, and when the compound is thoroughly blended, the reversible motor is caused to effect rotation in the opposite direction to feed the material forward into a primary extruding chamber or die head 28. Provision is made for maintaining the compound at a relatively high temperature during the mixing operation, and as best shown in Fig. 2 this may be accomplished by the circulation of heat transfer oil through a jacket 32 formed about the pug shell 36 of the hopper 10. The heat transfer oil enters from a supply thereof through an inlet 30 and passes through the jacket 32 and through the outlet 34 to be recirculated. In practice the oil is preferably maintained at a controlled temperature of approximately 180° F. for most efficient blending of the ingredients and so that the mixture may be maintained at a desired viscosity. In operation the motor is reversed to effect feeding of the material into the primary extruding chamber 28, and in order to assure feeding of the material by the action of the pug knives and to prevent wedging of the material between the pug knives and rotation of the mixture with the shaft and knives the pug shell 36 is preferably provided with lands 38 formed on the inner surface thereof, and in order to further assure forward feeding of the material a plurality of pins 39 are extended inwardly from the pug shell, as shown, to fit between consecutive pug knives. These pins 39 form a comb and together with the lands 38 offer sufficient resistance to the slipping of the mastic compound along the inside circumference of the pug shell to overcome the resistance offered by the mastic flowing between and slipping past the pitched pug knives. The material thus advanced is forced into a feed worm 40 formed on the shaft 12 and interposed between the hopper 10 and the extruding chamber 28. In order to prevent slipping of the material about the worm shell 42 the shell is also provided with lands 44, and in order to further increase the resistance to slipping of the material between the shell and the worm and to thereby increase the rate of advance of the material, the worm may be provided with a high degree of polish, and the worm shell 42 may be provided with a jacket 46 for the circulation of cool water. In practice it was found that the chilled worm shell caused the mastic to adhere to the shell, thus setting up resistance to slipping of the material with the worm in the shell and effecting advance of the material into the extrusion chamber or die head 28.

The mastic material advanced into the die head 28 is forced through die plates 50, 52, the lower die plate 52 serving to disperse the compound into many very small strands 53 which greatly increases the exposed surface area of the total volume of compound so that cooling can be accelerated. As illustrated in Figs. 1 and 3, the small strands of extruded material are conducted through a cooling shaft 54 supplied with air from a motor driven fan 56 and pipe 58 into a casing 60 surrounding the cooling shaft and communicating therewith through an opening in the underside of the casing, the air being then caused to flow upwardly between the small strands. The small strands are preferably evenly spaced with respect to one another to permit even circulation of cool air between them as they pass from the primary extruding chamber 28 through the cooling shaft. The function of the die plate 50 is to equalize the pressure on die plate 52 so that all of the small strands of compound will be extruded with equal speed with respect to one another. Without die plate 50 the small strands of compound located in alignment with the worm 40 would be extruded at a faster speed than would those located on either side of said line of alignment with the worm. This irregular speed of extrusion through the die plate 52 may be overcome by arranging and varying the diameters of the holes in die plate 50 in a manner such that the smaller holes are located in alignment with the feed worm and progressively larger holes being located on both sides of said smaller holes. As a result, the small strands of compound are fed at a uniform rate by gravity from die plate 52 through the cooling shaft 54 and into the feed rolls 62, 64 of a lower or final extruding unit, indicated generally at 66. After passing through the cooling shaft the material is reduced from a mixing temperature of 180° F. to an extruding temperature of 95° F.

As shown in Fig. 3, diehead 28 of the upper extruder is preferably provided with a jacket 68 for circulation of heat transfer oil 70 to prevent the mastic from sticking to the relatively cool inside surface and to produce a more uniform flow of the mastic through die plates 50, 52, and further to eliminate the necessity for having to clean out the cold mastic of a previous run from this head before starting a new run. In practice it is desirable to have the temperature of the oil circulating around the die head 28 substantially the same as that circulating around the hopper 10 of the apparatus in order to maintain a uniform speed of extrusion.

Figure 11:
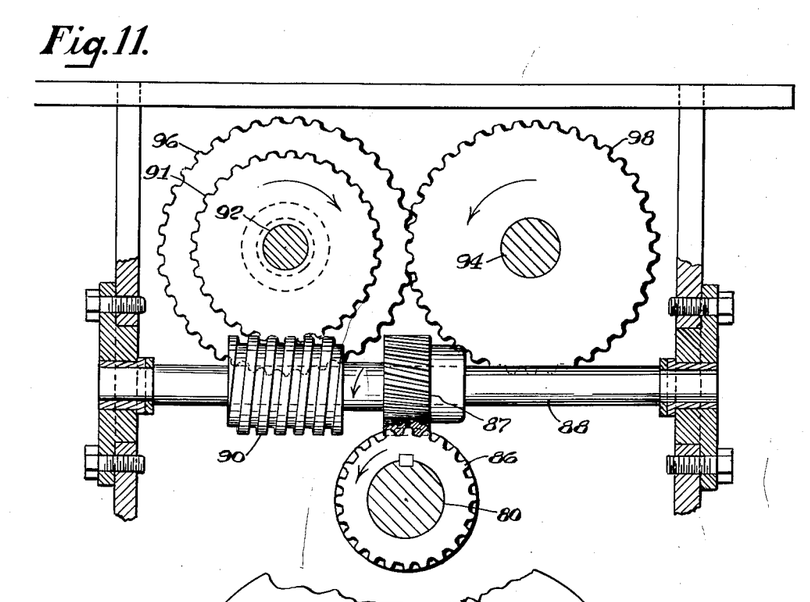
Fig. 11 is a cross-sectional view of drive means as viewed from the line 11—11 of Fig. 1.
Figure 12:
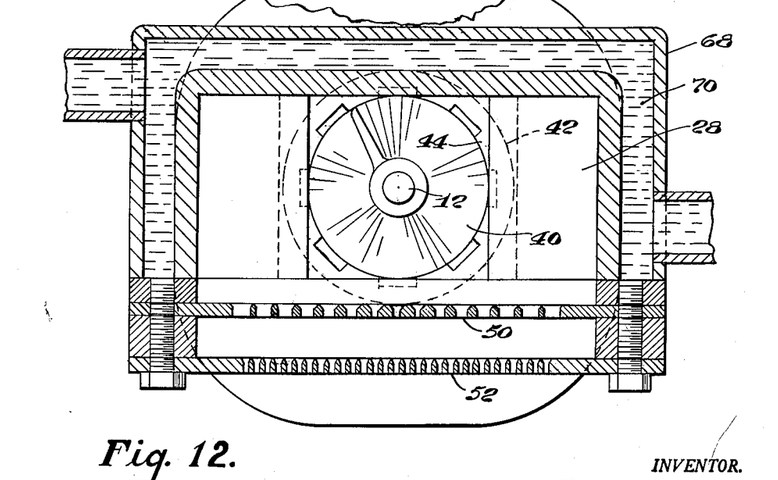
Fig. 12 is an enlarged cross-sectional view of the preliminary extruding mechanism.

As shown in Fig. 3, the feed rolls 62, 64 are spaced apart slightly and function to gather up the small individual strands 53 of compound and press them all together into a compact mass between the feed rolls and into the worm shell 72 of the lower extruder, the feed worm 74 forcing the compound through the final extruding die plate 76 and into the antistick coating and converging die indicated at 78. As herein shown, the feed worm 74 is fast on a shaft 80 arranged to be driven from a variable speed motor 82 by a chain and sprocket connection 84. The feed rolls 62, 64 are driven from the shaft 80 through helical gears 86, 87 to an intermediate shaft 88, and worm gears 90, 91 to the shaft 92 upon which the feed roll 64 is mounted, the other feed roll 62 mounted on shaft 94 being connected to rotate in the opposite direction by intermeshing spur gears 96, 98 fast on the shafts 92, 94 respectively, as shown in Fig. 11. It will be observed that the worm shell 72 of the lower extruder is also provided with lands 100 to afford sufficient resistance to the slipping of the mastic around the inside circumference of the shell so that the material will be advanced by the feed worm 74, and that the worm shell 72 is also provided with a jacket 102 adjacent the delivery end thereof for the circulation of cool water to cause the mastic to stick to the shell and to set up a resistance to rotation of the material with the worm. A pair of scrapers 101, 103 may be attached to the upper edges of the worm shell 72 for engagement with the feed rolls 62, 64 respectively to remove and guide the material from the feed rolls and into the worm shell 72.

As illustrated in detail in Figs. 4 and 5, the final extrusion die plate 76 is provided with a plurality of holes 77 equally spaced around a circle formed in the plate. The walls of the holes are preferably polished, and the mastic compound forced through the holes forms a plurality of round strands or ropes of the compound which are immediately pushed into the ends of their respective converging tubes 104 aligned therewith and through which an antistick fluid is caused to flow. In the illustrated embodiment of the invention there are sixteen openings in the final extrusion die plate 76 so that sixteen ropes are formed simultaneously, and in order to control the speed of extrusion of the individual strands emanating from the openings so that all sixteen ropes will be extruded at the same rate of speed, each extruding opening 77 is provided with a tapped hole radially extended therefrom and in which set screws 79 are mounted to intersect and extend into the extrusion openings as shown. In practice it was found that by tightening or loosening the set screws 79 to extend or retract the ends thereof from the path of the mastic compound, the speed at which the mastic flows through the corresponding die holes may be increased or decreased as required. In effect the ends of the screws 79 introduce a variable resistance to the flow of mastic through their respective die holes 77 so that in operation by individual adjustment of the screws, the feed may be controlled so that all of the strands are extruded at the same speed.

Figures 6, 7, 8:
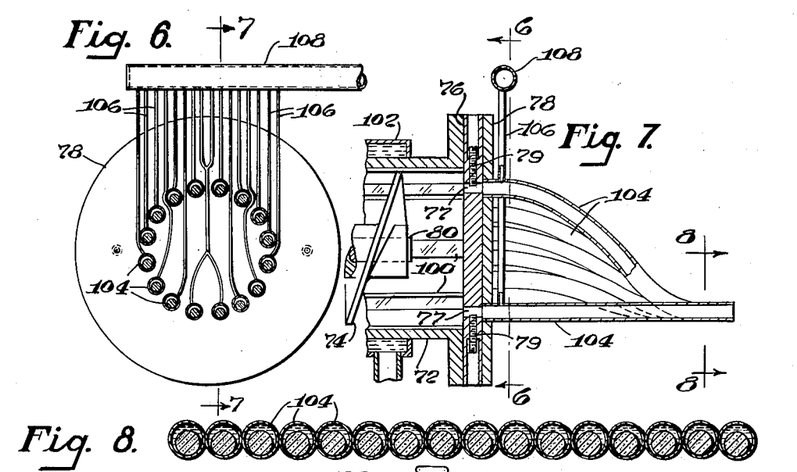
Fig. 6 is a cross-sectional view taken on the line 6—6 of Fig. 7 showing the antistick coating supply and strand converging die.
Fig. 7 is a cross-sectional view on the line 7—7 of Fig. 6.
Fig. 8 is a cross-sectional view on the line 8—8 of Fig. 7.

Referring now to Figs. 6 and 7, the inside diameters of the converging tubes 104 fixed in the plate 78 are larger than the diameters of the round strands of the compound inserted therein so that a minimum of frictional resistance is encountered, and the antistick fluid is supplied to the tubes by individual pipes 106 in communication with the top and adjacent the entrance ends of the tubes, as shown, the other ends of the pipes being connected to a supply manifold 108. As illustrated in Fig. 1, the manifold 108 is connected by a pipe 110 to a source of supply contained in a tank 112 from which the antistick fluid is withdrawn and recirculated by a pump 114.

The converging tubes 104 connected at one end in a circular path in alignment with the extrusion openings, as shown in Fig. 6, are bent and extended so that the other ends thereof are disposed in spaced horizontal parallel alignment, as shown in Fig. 8. In operation the antistick fluid introduced at the top of and close to the entrance ends of the ropes effects flooding of the ropes the instant they enter the converging tubes and also during their entire passage through the tubes. Thus, the antistick in addition to providing a coating for the ropes also serves to lubricate the mastic ropes and the walls of the converging tubes to minimize friction and permit the mastic ropes to be pushed around the bends in the tubes without liability of clogging of the material in the tubes.

Figures 9, 10:
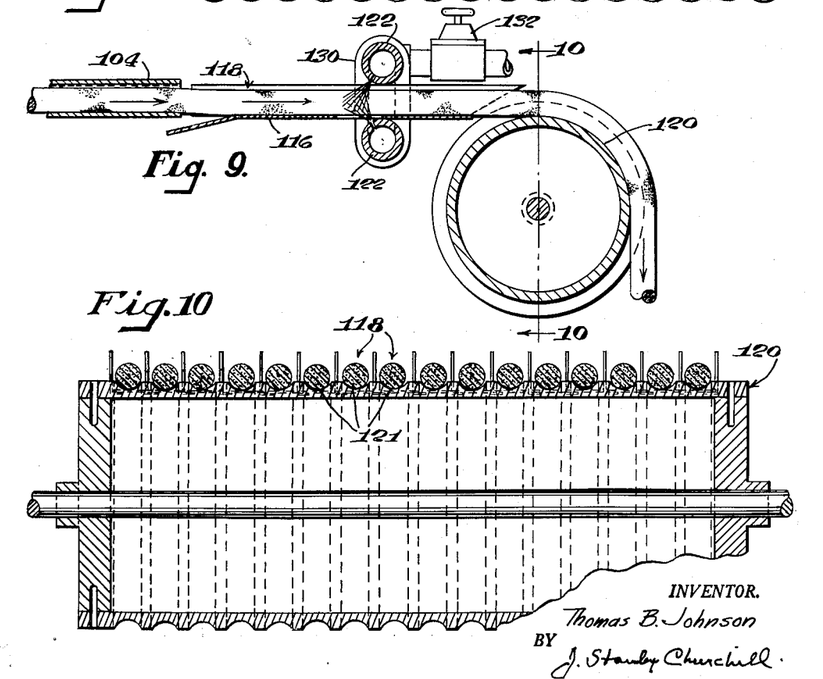
Fig. 9 is a cross-sectional detail view showing the provision for removing excess antistick from the strands.
Fig. 10 is a cross-sectional view taken on the line 10—10 of Fig. 9.

Referring now to Fig. 9, it will be observed that the ropes only partially fill the converging tubes, the remaining space in the tubes 104 being filled with the flowing antistick. As illustrated, the excess antistick fluid may flow from the exit ends of the tubes and onto a metal pan 116 which forms the bottom of a series of guiding troughs 118. These guiding troughs guide the ropes onto the top of an idling guide roll 120 provided with corresponding grooves 121 into which the ropes are fed and are held in spaced alignment as shown. Disposed intermediate the ends of the tubes 104 and the guide roll 120 and above and below guiding troughs 118, air lines 122 are provided having slits or openings which form air jets directed against the top and bottom surfaces of the ropes. The air jets converge on the ropes and serve to blow off the excess antistick which may drain into a catch-all 124 and through a drain pipe 126 into the antistick tank 112 where it is recirculated. The air lines 122 may be connected to a source of air under pressure and provided with an air reducing valve 132. In operation adjustment of the air reducing valve regulates the force of air through the jets and thus controls the thickness of the antistick coating remaining on the ropes.

Referring now to Fig. 1, after leaving the idling guide roll 120 the mastic ropes are permitted to feed by gravity downwardly through a rectangular air shaft 134 which is subjected to the pull produced by a fan 136 and the push produced by a fan 138. In this shaft hot air is forced by fan 138 and pulled by fan 136 around the surfaces of the spaced ropes which are wet and sticky because of the uncured antistick coating. During the time interval required for the ropes to pass through the air shaft 134, the circulating hot air serves to speed up the evaporation of the solvents contained in the antistick and thus causes the drying antistick to form a tough skin over the surface of the ropes. This tough skin also assists in preventing the ropes from breaking in two due to their own weight as they are suspended in the air shaft.

The mastic ropes leave the hot air shaft 134 at a side opening 139 and enter between a set of spaced guide vanes 140 arranged to guide the ropes down into the open end of a lower cool air shaft 142, form a loop and return upward and back between the lower extremities of the abovementioned guide vanes 140 and over a converger roll 144 before finally passing onto a take-up spool 150 forming a part of the reeling mechanism. In the open end of the lower cool air shaft 142 and between said shaft and the converger roll, cool air is circulated around the surfaces of the spaced ropes to produce setting up of the base material contained in the antistick and final drying of the antistick before the ropes are taken up on the spool. The final cool air blast may be produced by a pipe connection 146 to the fan 56 as illustrated.

In order to prevent sticking of the ropes to the guide roll 120 and the guide vanes 140 during the passage of the ropes thereover and therethrough in their partially cured condition the guide roll 120 may be made of brass and coated with mercury, and the surfaces of both the guide roll 120 and the guide vanes 140 as well as the converger roll 144 may be provided with a coating of silicone.

In operation, manual threading is required at the start of a run to pass the ropes between the lower guide vanes 140 and over the converger roll 144 onto the spool 150, and when a spool is filled the ropes may be cut and held in alignment at their ends either manually or by the use of a special tool so that the cut ends may be placed on a new spool at the start of a succeeding reeling operation. When the spool is being changed the machine is shut down temporarily, and during this period the hot air fan 138 is shut off to discontinue the flow of hot air through the hot air shaft 134 while the fan 136 is continued in operation to pull cool air into the shaft 134 through opening 139. This circulation of cool air around the temporarily stationary ropes in the air shaft effects cooling of the outer surfaces of the ropes to increase their resistance to being pulled in two during their temporary shut-down period, thus preventing excessive heating of the ropes which might cause them to soften to an extent such as to cause them to pull in two.

Figure 13:
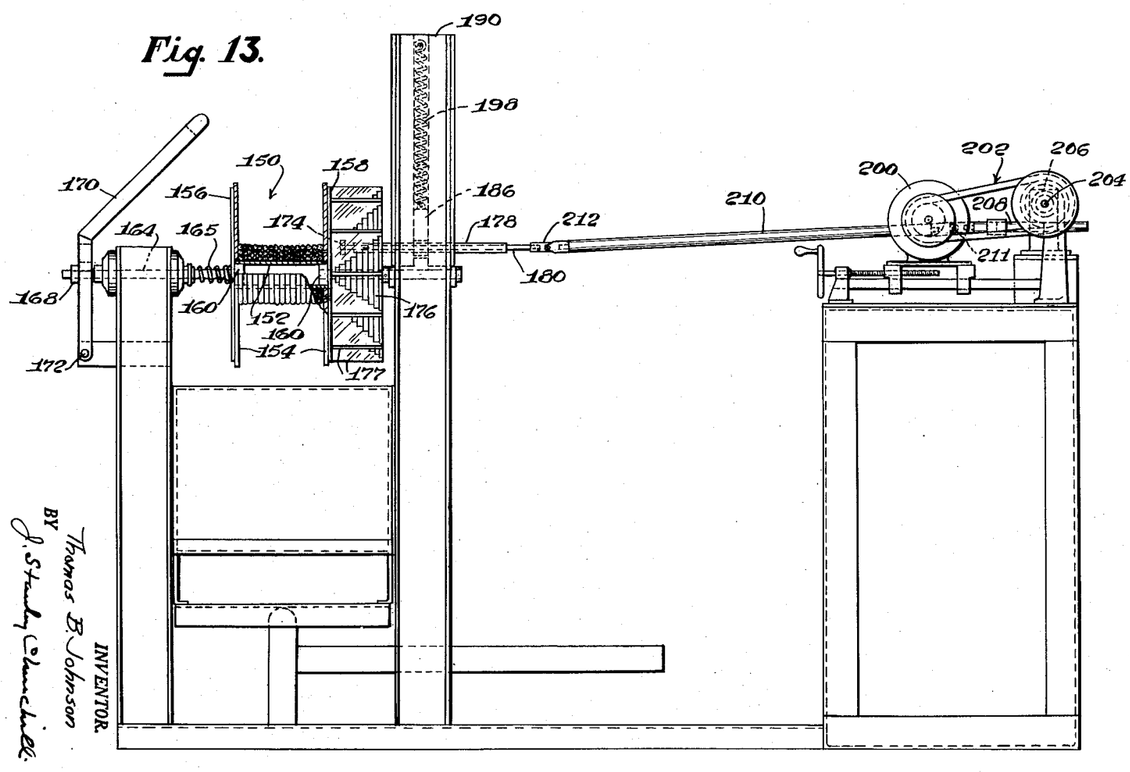
Fig. 13 is a side elevation of the strand reeling and take-up mechanism.

As illustrated in Fig. 13, the sixteen individual coils of mastic rope are reeled simultaneously onto the spool 150 side by side with the coils of rope tangent to each other. As above described, the strands are arranged and maintained in spaced relation as they pass over the guide roll 120 and between the spaced guide vanes 140 so as to provide space therebetween for the circulation of air. Thereafter the strands are brought together in tangent relationship by the converger roll 144, as illustrated in detail in Fig. 17, the strands extending from the roll directly onto the spool.

The reeling mechanism, as shown in Fig. 13, includes means for supporting and rotating the spool 150 at a constant surface take-up speed regardless of the change in diameter of the coil as it is reeled on the spool whereby to maintain the take-up of the strands at a speed corresponding to the speed of extrusion thereof. As herein shown, the spool 150 may comprise a fiberboard structure having a hollow tube 152 and provided with rectangular end flanges 154. The spool is supported between two disks 156, 158, each disk having a central inwardly extended hub portion 160 of a size to be snugly fitted into the ends of the hollow tube 152. The disk 158 is driven and is provided with sharp pins 162 which may be pierced through the adjacent fiberboard flange 154 to effect rotation of the spool with the disk. The opposing disk 156 comprises an idler supported on a shaft 164 journalled in bearings attached to the machine frame and having a spring 165 coiled about the shaft and interposed between the disk 156 and the frame to resiliently urge the disk into engagement with the spool. The outer end of the shaft 164 is provided with a collar 168 arranged to cooperate with a handle 170 pivoted at 172 to permit retraction of the disk 156 when the handle is rocked to the left to permit removal of a filled spool and insertion of a new spool.

Figures 14, 15, 16, 17:
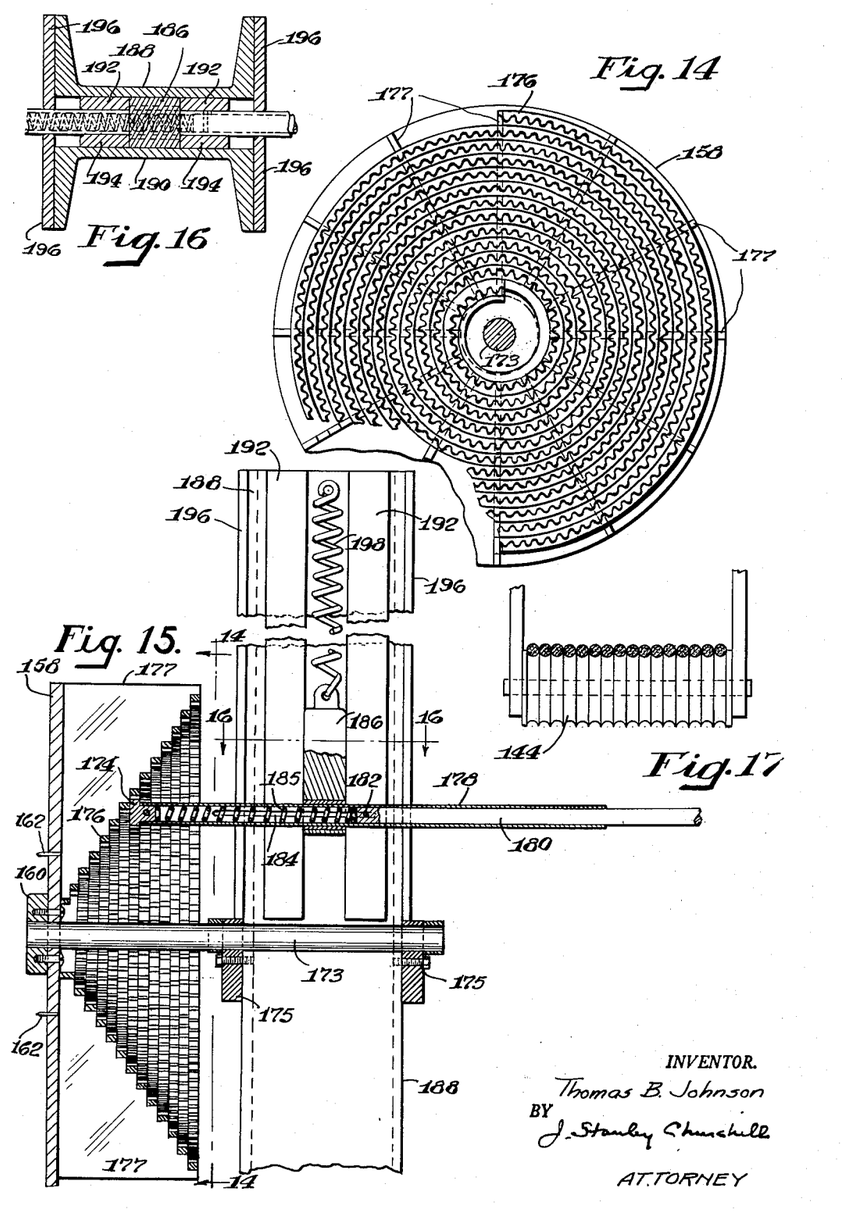
Fig. 14 is a detail view of the spiralled gear rack forming a part of the take-up mechanism, as viewed from the line 14—14 of Fig. 15.
Fig. 15 is a cross-sectional view of the take-up mechanism drive shown in Fig. 13.
Fig. 16 is a cross-sectional view taken on the line 16—16 of Fig. 15.
Fig. 17 is a detail view of the strand converging roller as seen from the line 17—17 of Fig. 1.

As herein shown, the disk 158, mounted on a shaft 173 rotatably journalled in bearings 175 attached to the machine frame, is arranged to be rotated to effect a constant take-up speed of the strands into coil form by a pinion 174 cooperating with a spiralled gear rack 176 attached to the disk and supported thereon by radially extended spacing members 177 which are cut out or stepped to receive and support the rack in its spiral form, as shown in Figs. 14 and 15. The pinion 174 is supported in a manner such as to cause it to follow the contour of the spiralled rack and in intermeshing engagement therewith. As shown in Fig. 15, the pinion is pinned to the end of a tube 178, the other end of the tube having a shaft 180 slidingly received therein and connected thereto by a pin and slot connection, the pin 182 being carried by and extended laterally from the inner end of the shaft 180 and extended into the slot 184 formed in the tube 178. A coil spring 185 disposed within the tube and interposed between the end of the pinion 174 and the end of the shaft 180 serves to resiliently urge the pinion to the left viewing Fig. 15 against the edge of the spiralled rack. The tube 178 is supported in a slide bearing 186 mounted to slide vertically between frame members 188, 190 and spacers 192, 194 and end guides 196. A coil spring 198 connected to the slide bearing 186 serves to resiliently urge the pinion upwardly into meshing engagement with the rack. With this construction it will be seen that the pinion is resiliently urged inwardly and upwardly to follow the contour of the spiralled rack, the end of the pinion following along the edge of the rack and the teeth of the pinion meshing with the toothed portion of the rack so that in operation when the pinion is initially placed in mesh with the inner end of the rack it is progressively moved outwardly and upwardly to compress the spring 185 and cause the tube to slide longitudinally in the bearing 186 and along the shaft 180.

In practice the pitch of the spiral or the radial distance between successive loops of the spiralled rack may be the same as the diameter of the mastic rope, and the contour or path followed by the spiralled rack is identical to the path followed by an individual coil of the mastic rope. As a result, the strands of mastic rope are formed into coils on the spool 150 at a constant surface take-up speed regardless of the change in diameter of the coil of rope as it is being reeled.

The shaft 180 may be driven from a variable speed motor 200 connected by a belt and pulley drive 202 to a shaft 204 comprising the input shaft of a speed reducing unit indicated at 206. The output shaft 208 is connected by an intermediate shaft 210 and universal joints 211, 212 to the shaft 180. Thus, in operation the operator may control the speed of the motor to effect reeling of the strands at a speed corresponding to the rate of extrusion of the ropes and to maintain the looped form of the strands in the chamber 142 so as to maintain a more or less constant time of exposure of the ropes to the final cool air blast.

In practice the rate of extrusion of the mastic compound through the primary or upper extruder 28 to disperse the material into many small strands 53 is preferably performed at a relatively slow rate of speed in order to increase the time of exposure of the small strands to the circulating cool air through the cooling shaft 54. In order to deliver sufficient material from the upper extruder to the relatively faster operating lower extruder, the upper extruder die plate 52 is of a size and is provided with sufficient openings so that the sum of the cross-sectional areas of all of the many small strands of mastic passing through the cooling shaft 54 is preferably about eight times the sum of the cross-sectional areas of the sixteen mastic ropes formed by the lower extruder. Thus, in practice the relatively small strands 53 of the mastic compound are arranged to travel at about one-eighth the speed of extrusion of the final mastic ropes. Also, in operation the surface speed of the feed rolls 62, 64 is preferably made equal to or slightly greater than the speed of extrusion of the small strands 53 passing through the cooling shaft to accommodate the material fed thereto and to deliver it to the worm shell 72 of the lower extruder. The speed of extrusion through the relatively faster operating lower extruder is such that it can take care of the amount of mastic material delivered by the feed rolls, and in order to limit this amount so as to assure that the lower extruder can handle the entire amount fed thereto, the capacity of the lower extruder is made considerably greater than the capacity of the upper extruder.

From the above description it will be seen that the present method and apparatus is adapted to produce a mastic caulking compound in rope or strand form provided with an antistick coating in a continuous operation from the mixing of the compound to the reeling of the coated strands on a spool in a rapid, efficient and economical manner. The outer coating comprises a relatively thin layer of a rupturable antistick material which when dried prevents the individual strands from sticking to each other or to other objects they may come in contact with, and in use the mastic rope may be rendered adhesive by compression and rupture of the antistick layer to permit the mastic material to pass out through the ruptured openings in the antistick layer, and in effect render the entire strand adhesive to enable it to be used for any of the various purposes as in glazing, caulking and in forming a water and weather-tight seal, as between overlapping roofing sheets.

While the preferred embodiment of the invention has been herein illustrated and described, it will be understood that the invention may be embodied in other forms within the scope of the following claims.

Having thus described the invention, what is claimed is:

1. The method of producing a mastic caulking compound in strand form in a continuous operation which consists in forming a mass of an adhesive plastic waterproof compound at a relatively high temperature and at a relatively low viscosity, then rapidly reducing the temperature of the compound by extruding the mass into a plurality of relatively small spaced and elongated continuous strands to increase the exposed surface area of the compound, subjecting the elongated spaced small strands to the circulation of cool air between and around the strands to increase the viscosity of the compound, gathering the ends of the elongated cooled strands as they are continuously extruded and again forming a mass, extruding the cooled mass to form a plurality of elongated relatively larger diameter caulking strands, applying a liquid anti-stick protective coating to the strands following extrusion thereon, circulating hot air around the elongated continuous caulking strands to accelerate evaporation of the solvents in the anti-stick coating and to form a tough skin increasing the resistance of the strands to longitudinal stress, then looping the coated strands and circulating cool air around the looped strands to set up the base material of the anti-stick and effect final drying of the anti-stick coating, and then reeling the continuous coated strands into individual spiral rolls arranged in side by side relation.

2. The method of producing a mastic caulking compound in a continuous operation as defined in claim 1 which includes the step of controlling the thickness of the anti-stick coating.

3. The method of producing a mastic caulking compound as defined in claim 1 which includes the step of equalizing the extrusion pressure for extruding the plurality of relatively small spaced elongated strands to form uniform strands extruded at substantially equal rates of speed.

4. The method of producing a mastic caulking compound as defined in claim 1 which includes the step of controlling the extrusion of individual caulking strands to equalize the speed of extrusion of all of the strands.

5. Apparatus for producing a mastic caulking compound in strand form in a continuous operation comprising, in combination, a mixing hopper for forming a mass of an adhesive plastic waterproof compound, means for maintaining the mass at a relatively high temperature and low viscosity during the mixing operation, means for dispersing the mass to reduce the temperature thereof including means for extruding the hot mass to form a plurality of relatively small spaced elongated and continuous strands to increase the exposed surface area, means for circulating cool air between and around said elongated small strands to increase the viscosity of the compound, collecting means including a pair of feed rolls arranged to receive the ends of the elongated cooled strands and to press them together into a mass, means for receiving and extruding the cooled mass including an extruding die to form a plurality of continuous caulking strands, means for applying a liquid anti-stick coating to the strands as they are being extruded, an elongated hot air chamber through which the continuous caulking strands are passed to accelerate evaporation of the solvents in the anti-stick, an elongated cool air chamber through which each continuous caulking strand is looped to provide a substantial length of the strands subjected to cooling to effect final drying of the anti-stick coating, said drying operations effecting hardening of the anti-stick and setting up at the base materials in the anti-stick to increase its resistance to longitudinal stress, means for reeling each strand into individual spirally wound rolls in side by side relation.

6. In apparatus for producing a mastic caulking compound, in combination, extruding means for forming a plurality of caulking strands including a feed worm arranged to receive and advance a mass of the compound, an extruding die having a plurality of equal diameter openings to form a plurality of strands simultaneously, and means for controlling the speed of extrusion of individual strands so that all of the strands are extruded at the same speed including a screw mounted to extend at right angles into each opening capable of adjustment to provide a variable resistance to the flow of compound through their respective die openings.

7. In apparatus for producing a mastic caulking compound as defined in claim 5 which includes means for operating the dispersing extruder to effect a relatively slow rate of travel of the small spaced strands to increase the time of exposure to the circulating cool air, and means for operating the caulking strand extrusion means to effect a relatively faster rate of travel of the extruded strands, the amount of the compound being dispersed at a relatively slow rate in a predetermined time being proportionate to the amount of the compound being extruded at a faster rate in the same time interval.

References Cited in the file of this patent

UNITED STATES PATENTS

| | | |
|---|---|---|
| 505,975 | Fate | Oct. 3, 1893 |
| 785,637 | Schlickeysen | Mar. 21, 1905 |
| 886,768 | Bogory | May 5, 1908 |
| 1,156,096 | Price | Oct. 12, 1915 |
| 1,547,683 | Reid et al. | July 28, 1925 |
| 2,006,585 | Downard | July 2, 1935 |
| 2,146,532 | Crane et al. | Feb. 7, 1939 |
| 2,252,684 | Babcock | Aug. 19, 1941 |
| 2,286,405 | Gordon | June 16, 1942 |
| 2,289,774 | Graves | July 14, 1942 |
| 2,365,374 | Bailey | Dec. 19, 1944 |
| 2,371,722 | Wanderer | Mar. 20, 1945 |
| 2,376,511 | Saunders et al. | May 22, 1945 |
| 2,459,745 | Waters | Jan. 18, 1949 |
| 2,460,390 | McDermott | Feb. 1, 1949 |
| 2,547,151 | Braeseke | Apr. 3, 1951 |
| 2,581,769 | Olson | Jan. 8, 1952 |
| 2,584,208 | Holmgren | Feb. 5, 1952 |
| 2,705,621 | MacKinney et al. | Apr. 5, 1955 |

FOREIGN PATENTS

| | | |
|---|---|---|
| 624,699 | Great Britain | June 15, 1949 |